(12) United States Patent
Matsubara et al.

(10) Patent No.: US 10,676,092 B2
(45) Date of Patent: Jun. 9, 2020

(54) CONTROL DEVICE OF VEHICLE

(71) Applicant: TOYOTA JIDOSHA KABUSHIKI KAISHA, Toyota-shi, Aichi (JP)

(72) Inventors: Keigo Matsubara, Nagoya (JP); Chikashi Ohta, Toyota (JP); Masami Kondo, Niwa-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 92 days.

(21) Appl. No.: 15/873,258

(22) Filed: Jan. 17, 2018

(65) Prior Publication Data

US 2018/0201269 A1    Jul. 19, 2018

(30) Foreign Application Priority Data

Jan. 19, 2017   (JP) ................................. 2017-007977

(51) Int. Cl.
*B60W 30/18* (2012.01)
*B60W 10/02* (2006.01)
*B60W 10/06* (2006.01)

(52) U.S. Cl.
CPC ...... *B60W 30/18136* (2013.01); *B60W 10/02* (2013.01); *B60W 10/026* (2013.01); *B60W 10/06* (2013.01); *B60W 30/18072* (2013.01); *B60W 2030/18081* (2013.01); *B60W 2510/0241* (2013.01); *B60W 2510/0291* (2013.01); *B60W 2510/0638* (2013.01); *B60W 2510/0657* (2013.01); *B60W 2710/025* (2013.01); *B60W 2710/06* (2013.01); *B60W 2710/0627* (2013.01);

(Continued)

(58) Field of Classification Search
CPC .... B60W 10/02; B60W 10/026; B60W 10/06; B60W 30/18072; B60W 2030/18081
See application file for complete search history.

(56) References Cited

U.S. PATENT DOCUMENTS 9,944,286 B2 *   4/2018   Kamiya .................. F16H 61/14
2002/0038174 A1   3/2002   Koumura et al.
(Continued)

FOREIGN PATENT DOCUMENTS

GB   2498222 A *   7/2013 ............ B60W 10/02
JP   H05-164241 A   6/1993
(Continued)

*Primary Examiner* — Stacey A Fluhart
(74) *Attorney, Agent, or Firm* — Oliff PLC

(57) ABSTRACT

A vehicle control device has an engine, automatic transmission, and torque converter disposed between the engine and the automatic transmission. The torque converter includes a lockup clutch coupling an input member to an output member of the torque converter. The control device has: a slip control portion controlling lockup clutch slip when deceleration running; and a fuel cut control portion performing an engine fuel cut when deceleration running and to terminate the fuel cut when an engine rotation speed is reduced to a predetermined rotation speed or less during the fuel cut, the fuel cut control portion being permitted to perform the fuel cut, based on lockup clutch slip pressure controlled by the slip control portion has reached a slip pressure value at which the engine rotation speed does not decrease due to a shortage of torque capacity of the lockup clutch even when the fuel cut is performed.

4 Claims, 9 Drawing Sheets

(52) U.S. Cl.
  CPC ........... *B60W 2710/0644* (2013.01); *B60W 2710/0655* (2013.01)

(56) References Cited

U.S. PATENT DOCUMENTS

| | | | |
|---|---|---|---|
| 2012/0157262 A1* | 6/2012 | Bastian | B60W 10/06 477/182 |
| 2017/0072961 A1* | 3/2017 | Yoon | B60W 30/18072 |
| 2017/0080944 A1* | 3/2017 | Petillon | B60W 30/18072 |
| 2018/0245685 A1* | 8/2018 | Kawasumi | F16H 59/38 |

FOREIGN PATENT DOCUMENTS

| | | |
|---|---|---|
| JP | 2001-304003 A | 10/2001 |
| JP | 2005-112080 A | 4/2005 |

\* cited by examiner

| | ENGAGEMENT OPERATION TABLE | | | | | |
|---|---|---|---|---|---|---|
| | C1 | C2 | C3 | C4 | B1 | B2 |
| 1st | ○ | | | | | ○ |
| 2nd | ○ | | | | ○ | |
| 3rd | ○ | | ○ | | | |
| 4th | ○ | | | ○ | | |
| 5th | ○ | ○ | | | | |
| 6th | | ○ | | ○ | | |
| 7th | | ○ | ○ | | | |
| 8th | | ○ | | | ○ | |
| Rev | | | ○ | | | ○ |

FIG.6

|  | OIL TEMPERATURE | | | | | |
|---|---|---|---|---|---|---|
| ENGINE TORQUE | P11 | P21 | P31 | P41 | P51 | P61 |
| | P12 | P22 | P32 | P42 | P52 | P62 |
| | P13 | P23 | P33 | P43 | P53 | P63 |
| | P14 | P24 | P34 | P44 | P54 | P64 |
| | P15 | P25 | P35 | P45 | P55 | P65 |
| | P16 | P26 | P36 | P46 | P56 | P66 |

FIG.9

|  | OIL TEMPERATURE | | | | | |
|---|---|---|---|---|---|---|
| ENGINE TORQUE | t11 | t21 | t31 | t41 | t51 | t61 |
| | t12 | t22 | t32 | t42 | t52 | t62 |
| | t13 | t23 | t33 | t43 | t53 | t63 |
| | t14 | t24 | t34 | t44 | t54 | t64 |
| | t15 | t25 | t35 | t45 | t55 | t65 |
| | t16 | t26 | t36 | t46 | t56 | t66 | ated
CONTROL DEVICE OF VEHICLE

This application claims priority from Japanese Patent Application No. 2017-007977 filed on Jan. 19, 2017, the disclosure of which is herein incorporated by reference in its entirety.

BACKGROUND OF THE INVENTION

1. Field of the Invention

The present invention relates to a control device of a vehicle and, more particularly, to a technique of controlling a slip pressure of a lockup clutch and a fuel cut of an engine.

2. Description of the Related Art

In a vehicle provided with an engine, an automatic transmission and a torque converter disposed between the engine and the automatic transmission, and the torque converter including a lockup clutch directly connecting an input member to an output member of the torque converter, a control device of a vehicle is known that includes a slip control means controlling a slip pressure of the lockup clutch at the time of deceleration running and a fuel cut control means performing a fuel cut of the engine at the time of the deceleration running. For example, this corresponds to a control device of a vehicle of Patent Document 1. The control device for the vehicle of Patent Document 1 provides a slip control of the lockup clutch and a fuel cut control during running of the vehicle at the time of deceleration running of the vehicle, so as to reduce an engagement shock occurring when the released lockup clutch is engaged and to achieve an improvement in fuel consumption.

PRIOR ART DOCUMENTS

Patent Document 1: JP-2005-112080A

However, if the slip control of the lockup clutch and the fuel cut control of the engine during running of the vehicle are provided at the time of deceleration running of the vehicle, in Patent Document 1, the fuel cut control is not permitted until the slip control becomes stable after accelerator-off, and therefore, a time until the fuel cut is started becomes longer so that the fuel efficiency improvement effect is reduced. If the fuel cut is performed immediately after the start of the slip control, torque capacity of the lockup clutch becomes insufficient, so that an engine rotation speed decreases to a rotation speed at which the fuel cut of the engine is cancelled. As a result, the control of the fuel cut is terminated and the fuel efficiency improvement effect is thereby reduced. Therefore, it is difficult to achieve both the improvement in fuel consumption and the improvement in drivability through the slip control at the same time.

SUMMARY OF THE INVENTION

The present invention was conceived in view of the situations and it is therefore an object of the present invention to provide, in a vehicle in which a slip control of a lockup clutch at the time of deceleration running and a fuel cut control of an engine during running are coordinately provided, a control device of the vehicle capable of achieving both an improvement in drivability and an improvement in fuel consumption in a wider range of a slip state of the lockup clutch.

According to a first mode of the invention, there is provided a control device of a vehicle provided with an engine, an automatic transmission and a torque converter disposed between the engine and the automatic transmission, and the torque converter including a lockup clutch directly coupling an input member to an output member of the torque converter, the control device of a vehicle comprising: a slip control portion controlling a slip of the lockup clutch at the time of deceleration running; and a fuel cut control portion performing a fuel cut of the engine at the time of deceleration running and terminating the fuel cut when an engine rotation speed is reduced to a predetermined rotation speed or less during the fuel cut, wherein the fuel cut control portion is permitted to perform the fuel cut of the engine, based on the fact that a slip pressure of the lockup clutch controlled by the slip control portion has reached a slip pressure value at which the rotation speed of the engine does not decrease due to a shortage of torque capacity of the lockup clutch even when the fuel cut is performed.

According to a second mode of the invention, the control device according to the first mode of the invention further comprises a slip pressure calculating portion calculating a slip pressure of the lockup clutch at which the rotation speed of the engine does not decrease based on an output torque of the engine and an oil temperature during the slip control of the lockup clutch by the slip control portion at the time of deceleration running. The fuel cut control portion is permitted to perform the fuel cut of the engine if the slip pressure of the lockup clutch is equal to or greater than the slip pressure value of the lockup clutch at which the rotation speed of the engine does not decrease due to a shortage of torque capacity of the lockup clutch even when the fuel cut is performed.

According to a third mode of the invention, the control device according to the first or second mode of the invention further comprises a slip establishment time calculating portion calculating a slip establishment time from a start of the slip control of the lockup clutch until reaching the slip pressure value of the lockup clutch at which the rotation speed of the engine does not decrease due to a shortage of torque capacity of the lockup clutch even when the fuel cut is performed, based on an output torque of the engine and an oil temperature. The fuel cut control portion is permitted to perform the fuel cut of the engine when an elapsed time from the start of the slip control of the lockup clutch is equal to or greater than the slip establishment time.

The first mode of the invention provides the control device of the vehicle provided with the engine, the automatic transmission, the torque converter disposed between the engine and the automatic transmission, and the lockup clutch directly coupling the input member to the output member of the torque converter; and the control device of the vehicle has the slip control portion controlling the slip of the lockup clutch at the time of the deceleration running and the fuel cut control portion performing the fuel cut of the engine at the time of the deceleration running and terminating the fuel cut when the engine rotation speed is reduced to the predetermined rotation speed or less during the fuel cut. The fuel cut control portion is permitted to perform the fuel cut of the engine, based on the fact that the slip pressure of the lockup clutch controlled by the slip control portion has reached the slip pressure at which the rotation speed of the engine does not decrease due to a shortage of the torque capacity of the lockup clutch even when the fuel cut is performed, and a condition for executing the slip of the lockup clutch at the time of the deceleration running is accurately determined. This makes it possible to improve the control of the lockup clutch at the time of the deceleration running and to expand the range of provision of the fuel cut control of the engine during running of the vehicle, so that both the improvement in drivability and the improvement in fuel consumption can be achieved at the same time.

The control device according to the second mode of the invention further comprises the slip pressure calculating portion calculating the slip pressure of the lockup clutch at which the rotation speed of the engine does not decrease during the slip control of the lockup clutch by the slip control portion at the time of the deceleration running, based on the output torque of the engine and the oil temperature. The fuel cut control portion is permitted to perform the fuel cut of the engine if the slip pressure of the lockup clutch is equal to or greater than the slip pressure of the lockup clutch at which the rotation speed of the engine does not decrease due to a shortage of torque capacity of the lockup clutch even when the fuel cut is performed, and the slip control of the lockup clutch at the time of the deceleration running and the fuel cut control of the engine during running of the vehicle can easily coordinately be provided, so that both the improvement in drivability and the improvement in fuel consumption can be achieved at the same time.

The control device according to the third mode of the invention further comprises the slip establishment time calculating portion calculating the slip establishment time from the start of the slip control of the lockup clutch until reaching the slip pressure of the lockup clutch at which the rotation speed of the engine does not decrease due to a shortage of the torque capacity of the lockup clutch even when the fuel cut is performed, based on the output torque of the engine and the oil temperature. The fuel cut control portion is permitted to perform the fuel cut of the engine if the elapsed time from the start of the slip control of the lockup clutch is equal to or greater than the slip establishment time, and the slip control of the lockup clutch at the time of the deceleration running and the fuel cut control of the engine during running of the vehicle can easily coordinately be provided, so that both the improvement in drivability and the improvement in fuel consumption can be achieved at the same time.

BRIEF DESCRIPTION OF THE DRAWINGS

FIG. 6 is an example of a preliminarily stored map for calculating a slip pressure of the lockup clutch at which a rotation speed of an engine does not decrease, based on an oil temperature and an engine output torque.

FIG. 9 is an example of a preliminarily stored map for calculating a slip establishment time until the slip pressure of the lockup clutch at which the rotation speed of the engine does not decrease, based on the oil temperature and the engine output torque.

DESCRIPTION OF THE PREFERRED EMBODIMENTS

An example of the present invention will now be described in detail with reference to the drawings. In the following examples, the figures are simplified or deformed as needed and portions are not necessarily precisely drawn in terms of dimension ratio, shape, etc.

First Example

Figure 1:
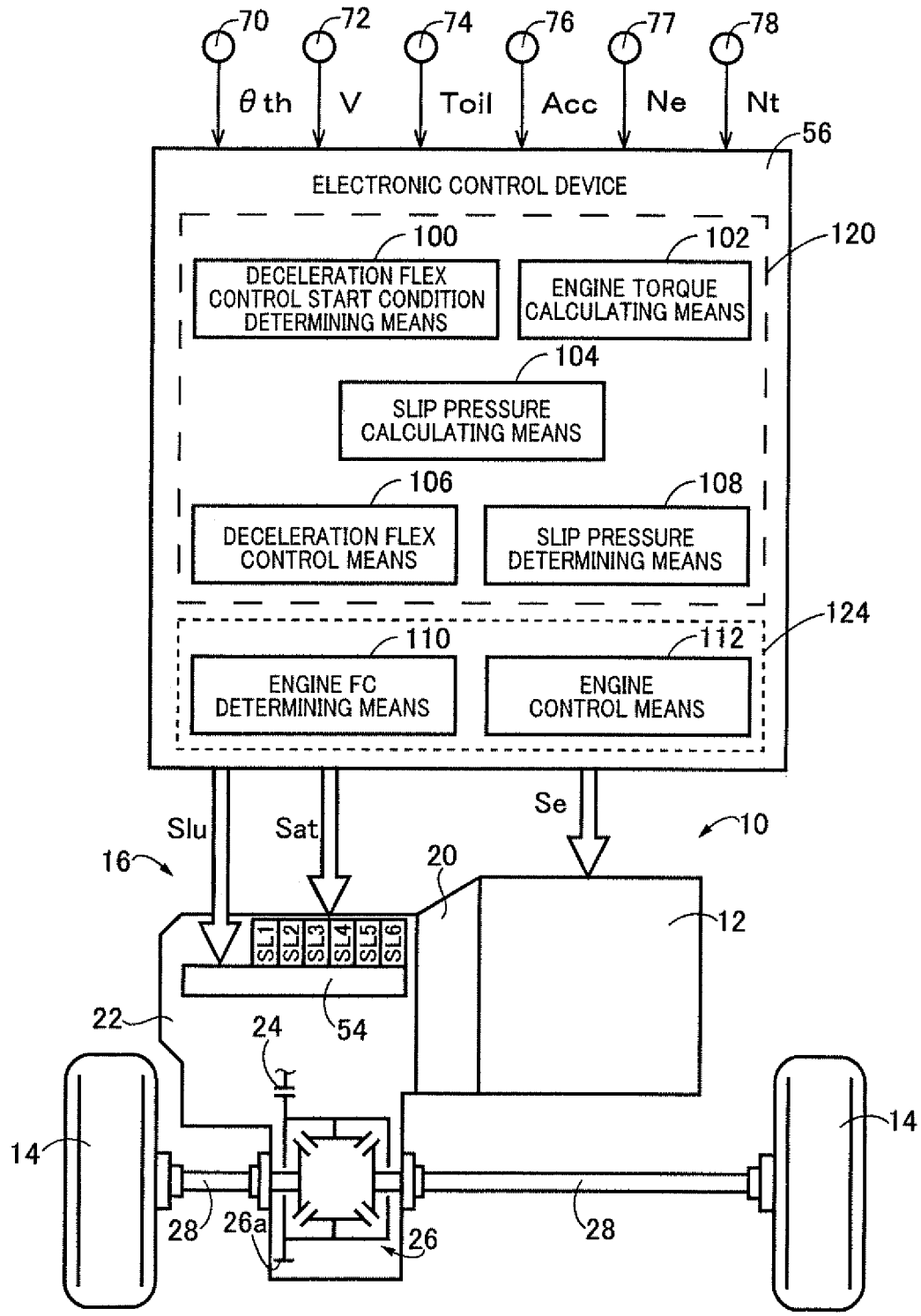
FIG. 1 is a diagram for explaining a schematic configuration of a vehicle to which the present invention is applied and is a diagram for explaining a main portion of a control system for various controls in the vehicle.

FIG. 1 is a diagram for explaining a schematic configuration of a vehicle 10 to which the present invention is applied and is a diagram for explaining a main portion of a control system for various controls in the vehicle 10. In FIG. 1, a vehicle 10 includes an engine 12, drive wheels 14, and a vehicle power transmission device 16 (hereinafter referred to as a power transmission device 16) disposed in a power transmission path between the engine 12 and the drive wheels 14. The power transmission device 16 includes a torque converter 20 and an automatic transmission 22 arranged in a case 18 (see FIG. 2) serving as a non-rotary member attached to a vehicle body, as well as a differential gear device 26 having a ring gear 26a to which a transmission output gear 24 serving as an output rotary member of the automatic transmission 22 is coupled, a pair of axles 28 coupled to the differential gear device 26, etc. In the automatic transmission 22, power output from the engine 12 is transmitted from a crankshaft 12a sequentially through the torque converter 20, the automatic transmission 22, the differential gear device 26, the axles 28, etc. to the drive wheels 14. The torque converter 20 is disposed in a power transmission path between the automatic transmission 22 and the engine 12.

The engine 12 is a power source of the vehicle 10 and is an internal combustion engine such as a gasoline engine or a diesel engine, for example.

Figures 2, 3:
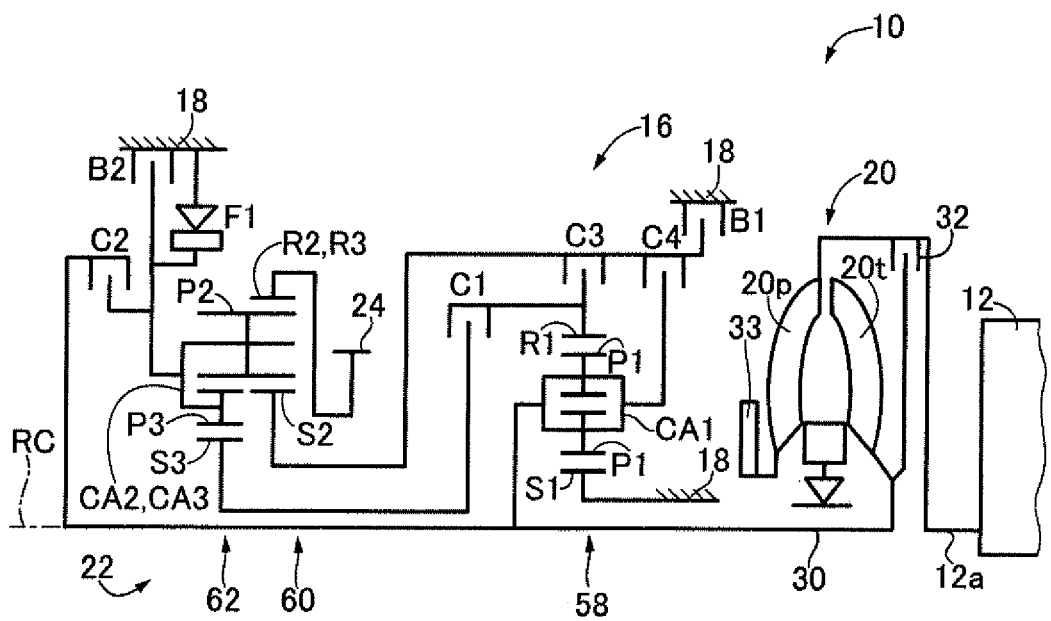
FIG. 2 is a skeleton diagram for explaining an example of a torque converter and an automatic transmission included in the vehicle of FIG. 1.
FIG. 3 is an engagement operation table for explaining a relationship between a shift operation of the automatic transmission of FIG. 2 and a combination of operations of hydraulic friction engagement devices used for the operation.

FIG. 2 is a skeleton diagram for explaining an example of the torque converter 20 and the automatic transmission 22. The torque converter 20, the automatic transmission 22, etc. are configured substantially symmetrically with respect to an axial center RC of a turbine shaft 30 that is an input rotary member of the automatic transmission 22 and have lower halves from the axial center RC not shown in FIG. 2.

The torque converter 20 includes a pump impeller 20p coupled to the engine 12 and a turbine impeller 20t coupled to the turbine shaft 30. To the pump impeller 20p, a mechanical oil pump 33 is coupled that is rotationally driven by the engine 12 to generate a hydraulic oil pressure for providing shift control of the automatic transmission 22, switching respective operations of multiple hydraulic friction engagement devices C1-C4, B1, B2 described later, and supplying a lubrication oil to portions of the power transmission device 16. The torque converter 20 is provided with a lockup clutch 32 capable of connecting/disconnecting the pump impeller 20p and the turbine impeller 20t.

The automatic transmission 22 constitutes a portion of the power transmission path from the engine 12 to the drive wheels 14 and is a planetary gear type multi-speed transmission acting as a step-variable automatic transmission having multiple gear positions (shift positions) different in gear ratio (transmission ratio) formed by selective engagement of any of the multiple hydraulic friction engagement devices (first to fourth clutches C1 to C4, a first brake B1, a second brake B2) and a one-way clutch F1. For example, the automatic transmission is a step-variable transmission for performing a so-called clutch-to-clutch shift frequently used in a vehicle. The automatic transmission 22 has a double pinion type first planetary gear device 58 as well as a single pinion type second planetary gear device 60 and a double pinion type third planetary gear device 62 configured as a Ravigneaux type, on a coaxial line (on the axial center RC), and changes a speed of rotation of the turbine shaft 30 and outputs from the transmission output gear 24.

The first planetary gear device 58 includes a first sun gear S1 that is an external gear, a first ring gear R1 that is an internal gear and arranged concentrically with the first sun gear S1, a first pinion gear P1 made up of a pair of gear pairs and meshing with the first sun gear S1 and the first ring gear R1, and a first carrier CA1 supporting the first pinion gear P1 in a rotatable and revolvable manner.

The second planetary gear device 60 includes a second sun gear S2 that is an external gear, a second ring gear R2 that is an internal gear and arranged concentrically with the second sun gear S2, a second pinion gear P2 meshing with the second sun gear S2 and the second ring gear R2, and a second carrier CA2 supporting the second pinion gear P2 in a rotatable and revolvable manner.

The third planetary gear device 62 includes a third sun gear S3 that is an external gear, a third ring gear R3 that is an internal gear and arranged concentrically with the third sun gear S3, a third pinion gear P3 made up of a pair of gear pairs and meshing with the third sun gear S3 and the third ring gear R3, and a third carrier CA3 supporting the third pinion gear P3 in a rotatable and revolvable manner.

The first clutch C1, the second clutch C2, the third clutch C3, the fourth clutch C4, the first brake B1, and the second brake B2 (hereinafter simply referred to as hydraulic friction engagement devices or engagement elements if not particularly distinguished) are made up of wet multiplate type clutches and brakes pressed by hydraulic actuators, band brakes fastened by hydraulic actuators, etc.

The engagement and release of these hydraulic friction engagement devices are controlled to form the gear positions for eight forward speeds and one backward speed according to an accelerator operation by a driver, a vehicle speed V, etc., as shown in an engagement operation table of FIG. 3. In FIG. 3, "1st" to "8th" mean first to eighth shift positions for the forward gear positions while "Rev" means a reverse shift position for the reverse gear position, and a gear ratio γ(=turbine shaft rotation speed Nin/transmission output gear rotation speed Nout) of the automatic transmission 22 corresponding to each of the shift positions is appropriately determined by gear ratios (=the number of teeth of the sun gear/the number of teeth of the ring gear) of the first planetary gear device 58, the second planetary gear device 60, and the third planetary gear device 62.

Figure 4:
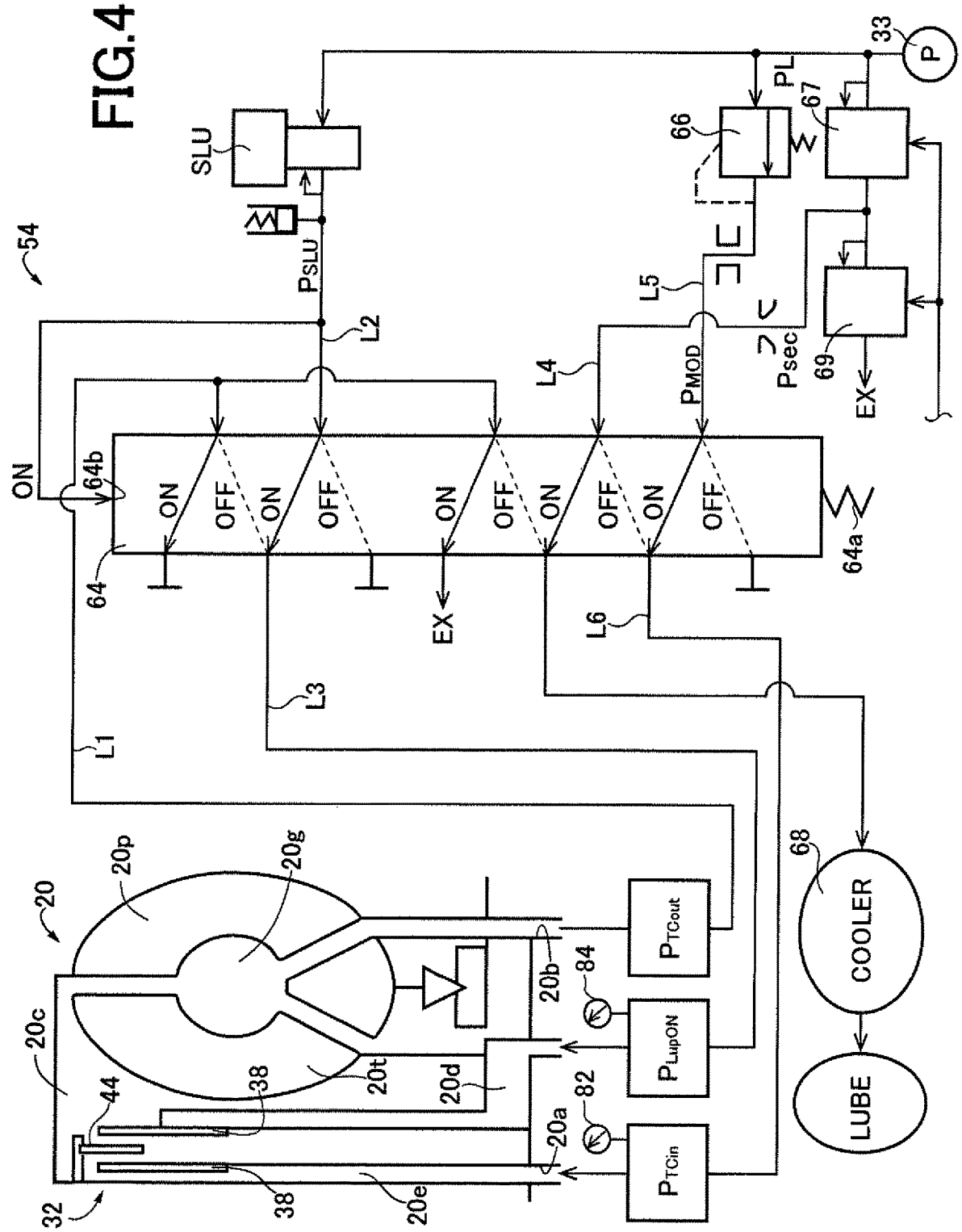
FIG. 4 is a circuit diagram of an example of a main portion of a hydraulic control circuit related to a lockup clutch disposed in the torque converter of FIG. 2 and a linear solenoid valve etc. controlling the operation of the lockup clutch.

As shown in FIG. 4, the torque converter 20 includes the pump impeller 20p coupled to the crankshaft 12a of the engine 12 in a power transmittable manner and corresponding to an input member arranged to rotate around the axial center RC, and the turbine impeller 20t corresponding to an output member coupled to the turbine shaft 30 in a power transmittable manner. As is well known, the lockup clutch 32 is a hydraulic friction clutch having a mechanism allowing a first friction plate 38 and a second friction plate 44 to slip to generate a differential rotation therebetween and frictionally engaged under control of a hydraulic control circuit 54. As shown in FIG. 4, the torque converter 20 is provided with a main oil chamber 20c having a hydraulic oil supply port 20a supplied with the hydraulic oil output from the oil pump 33 and a hydraulic oil outflow port 20b allowing the hydraulic oil supplied from the hydraulic oil supply port 20a to flow out. In the main oil chamber 20c, the torque converter 20 is provided with the lockup clutch 32, a control oil chamber 20d supplied with a lockup-on pressure $P_{LupON}$, a front-side oil chamber 20e supplied with a torque-converter-in pressure $P_{TCin}$, and a rear-side oil chamber 20g communicating with the front-side oil chamber 20e and filled with the hydraulic oil from the front-side oil chamber 20e to allow the hydraulic oil to flow out from the hydraulic oil outflow port 20b. A hydraulic pressure gauge 82 and a hydraulic pressure gauge 84 are disposed in the vicinities of the front-side oil chamber 20e and the control oil chamber 20d, respectively.

The lockup clutch 32 has a transmission torque controlled based on a differential pressure i.e., a lockup engagement differential pressure $Pc(=P_{LupON}-(P_{TCin}+P_{TCout})/2)$, between the lockup-on pressure $P_{LupON}$ (kPa) in the control oil chamber 20d and an average value $(P_{TCin}+P_{TCout})/2$ of the torque-converter-in pressure $P_{TCin}$ (kPa) in the front-side oil chamber 20e and a torque-converter-out pressure $P_{TCout}$ (kPa) output from the hydraulic oil outflow port 20b. The equation of the lockup engagement differential pressure $Pc(=P_{LupON}-(P_{TCin}+P_{TCout})/2)$ is an experimental equation determined in advance through an experiment etc., and the average value $(P_{TCin}+P_{TCout})/2$ is also referred to as a back pressure. In the equation, the torque-converter-in pressure $P_{TCin}$ and the torque-converter-out pressure $P_{TCout}$ vary due to an engine rotation speed Ne (rpm), a turbine rotation speed Nt (rpm), a difference rotation speed (the engine rotation speed—the turbine rotation speed) ΔN (rpm) thereof, a second line hydraulic pressure Psec (kPa), a hydraulic oil temperature Toil (° C.), an output torque Te (Nm) of the engine 12 (hereinafter, the output torque of the engine is referred to as an engine torque), etc. The torque-converter-out pressure $P_{TCout}$ varies when a centrifugal hydraulic pressure in the rear-side oil chamber 20g of the torque converter 20 is changed due to a change in the engine rotation speed Ne, the turbine rotation speed Nt, the hydraulic oil temperature Toil, etc.

When the lockup engagement differential pressure Pc is controlled by an electronic control device (corresponding to a control device of the present invention) 56 via the hydraulic control circuit 54, the lockup clutch 32 is switched to any operation state out of, for example, a so-called lockup release state (lockup-off) in which the lockup engagement differential pressure Pc is made negative to release the lockup clutch 32, a so-called lockup slip state (slip state) in which the lockup engagement differential pressure Pc is made equal to or greater than zero to partially engage, i.e., to engage with a slip, the lockup clutch 32, and a so-called lockup state (lockup-on) in which the lockup engagement differential pressure Pc is set to a maximum value to completely engage the lockup clutch 32. It is noted that the engagement state of the lockup clutch 32 in this example means not only a direct coupling state but also an operation state of the lockup clutch 32 from the slip state to the direct coupling state and, for example, in flex control in which the lockup clutch 32 is controlled in a predetermined slip state, the lockup engagement differential pressure Pc is also referred to as a slip pressure Pc. Regardless of whether the lockup clutch 32 is in the lockup state, the lockup slip state, or the lockup release state, the front-side oil chamber 20e and the rear-side oil chamber 20g of the torque converter 20 are in the same chamber, i.e., the front-side oil chamber 20e and the rear-side oil chamber 20g are always in communication with each other, and the lockup clutch 32 is suitably cooled by the hydraulic oil supplied from the hydraulic oil supply port 20a.

As shown in FIG. 4, the hydraulic control circuit 54 includes a lockup control valve 64; a linear solenoid valve SLU regulating to a lockup engagement pressure $P_{SLU}$ a first line hydraulic pressure PL regulated by a relief type first line pressure regulating valve 67 by using as a source pressure a hydraulic pressure generated from the oil pimp 33; and a modulator valve 66 regulating a modulator hydraulic pressure $P_{MOD}$ to a constant value by using the first line hydraulic pressure PL as a source pressure. The hydraulic control circuit 54 includes linear solenoid valves SL1 to SL6 (see FIG. 1) controlling operations of hydraulic actuators not shown of the hydraulic friction engagement devices. Although the first line hydraulic pressure PL is used as the source pressure of the linear solenoid valve SLU in FIG. 4, the modulator hydraulic pressure $P_{MOD}$ may be used instead of the first line hydraulic pressure PL.

As shown in FIG. 4, the lockup control valve 64 is a two-position switching valve of the type switched from an OFF position to an ON position when the lockup engagement pressure $P_{SLU}$ exceeds a predetermined value and, at the ON position, the valve 64 closes a first oil passage L1, connects a second oil passage L2 to a third oil passage L3, connects the first oil passage L1 to a discharge oil passage EX, connects a fourth oil passage L4 to a cooler 68, and connects a fifth oil passage L5 to a sixth oil passage L6. The first oil passage L1 is an oil passage through which the torque-converter-out pressure $P_{TCout}$ output from the hydraulic oil outflow port 20b of the torque converter 20 is guided. The second oil passage L2 is an oil passage through which the lockup engagement pressure $P_{SLU}$ regulated by the linear solenoid valve SLU is guided. The third oil passage L3 is an oil passage through which the lockup-on pressure $P_{LupON}$ supplied to the control oil chamber 20d of the torque converter 20 is guided. The fourth oil passage L4 is an oil passage through which the second line hydraulic pressure Psec is guided that is regulated by a second line pressure regulating valve 69 by using the hydraulic pressure relieved from the first line pressure regulating valve 67 as a source pressure. The fifth oil passage L5 is an oil passage through which the modulator hydraulic pressure $P_{MOD}$ regulated to a constant value by the modulator valve 66 is guided. The sixth oil passage L6 is an oil passage through which the torque-converter-in pressure $P_{TCin}$ supplied to the front-side oil chamber 20e of the torque converter 20 is guided.

As shown in FIG. 4, at the OFF position, the lockup control valve 64 connects the first oil passage Li to the third oil passage L3, closes the second oil passage L2, connects the first oil passage L1 to the cooler 68, connects the fourth oil passage L4 to the sixth oil passage L6, and closes the fifth oil passage L5. The lockup control valve 64 includes a spring 64a urging a spool valve piece toward the OFF position and an oil chamber 64b receiving the lockup engagement pressure $P_{SLU}$ for urging the spool valve piece toward the ON position. When the lockup engagement pressure $P_{SLU}$ is smaller than a predetermined value set relatively small in the lockup control valve 64, the spool valve piece is retained at the OFF position by the urging force of the spring 64a. When the lockup engagement pressure $P_{SLU}$ is larger than the predetermined value in the lockup control valve 64, the spool valve piece is retained at the ON position against the urging force of the spring 64a. In the lockup control valve 64 of FIG. 4, a solid line shows a flow passage when the spool valve piece is at the ON position, and a broken line shows a flow passage when the spool valve piece is at the OFF position.

When the hydraulic control circuit 54 configured as described above switches the hydraulic pressure supplied from the lockup control valve 64 to the control oil chamber 20d and the front-side oil chamber 20e in the torque converter 20, the operation state of the lockup clutch 32 is switched. First, the case of the lockup clutch 32 set to the slip state or lockup-on will be described. When the lockup engagement pressure $P_{SLU}$ made larger than the predetermined value is supplied in the lockup control valve 64 according to a command signal output from the electronic control device 56, the lockup control valve 64 is switched to the ON position, so that the lockup engagement pressure $P_{SLU}$ is supplied to the control oil chamber 20d of the torque converter 20 while the modulator hydraulic pressure $P_{MOD}$ supplied to the lockup control valve 64 is supplied to the front-side oil chamber 20e of the torque converter 20. In other words, the lockup engagement pressure $P_{SLU}$ is supplied as the lockup-on pressure $P_{LupON}$ to the control oil chamber 20d, and the modulator hydraulic pressure $P_{MOD}$ is supplied as the torque-converter-in pressure $P_{TCin}$ to the front-side oil chamber 20e. When the lockup control valve 64 is switched to the ON position, the relationship of magnitude of the lockup-on pressure $P_{LupON}$, the torque-converter-in pressure $P_{TCin}$, and the torque-converter-out pressure $P_{TCout}$ satisfies the lockup-on pressure $P_{LupON}$>the torque-converter-in pressure $P_{TCin}$>the torque-converter-out pressure $P_{TCout}$. As a result, the lockup-on pressure (engagement pressure) $P_{LupON}$ of the control oil chamber 20d of the torque converter 20 is regulated by the linear solenoid valve SLU, so that the lockup engagement differential pressure ($P_{LupON}-(P_{TCin}+P_{TCout})/2$) Pc is regulated, and the operation state of the lockup clutch 32 is switched within the range of the slip state to the lockup on (complete engagement).

The case of the lockup clutch 32 set to the lockup-off will be described. When the lockup engagement pressure $P_{SLU}$ is smaller than the predetermined value in the lockup control valve 64, the lockup control valve 64 is switched to the OFF position by the urging force of the spring 64a, so that the torque-converter-out pressure $P_{TCout}$ output from the hydraulic oil outflow port 20b of the torque converter 20 is supplied to the control oil chamber 20d of the torque converter 20 while the second line hydraulic pressure Psec is supplied to the front-side oil chamber 20e of the torque converter 20. In other words, the torque-converter-out pressure $P_{TCout}$ is supplied as the lockup-on pressure $P_{LupON}$ to the control oil chamber 20d, and the second line hydraulic pressure Psec is supplied as the torque-converter-in pressure $P_{TCin}$ to the front-side oil chamber 20e. When the lockup control valve 64 is switched to the OFF position, the relationship of magnitude of the lockup-on pressure $P_{LupON}$, the torque-converter-in pressure $P_{TCin}$, and the torque-converter-out pressure $P_{TCout}$ satisfies the torque-converter-in pressure $P_{TCin}$>the torque-converter-out pressure $P_{TCout}$>the lockup-on pressure $P_{LupON}$. As a result, the operation state of the lockup clutch 32 is switched to the lockup-off.

Figure 5:
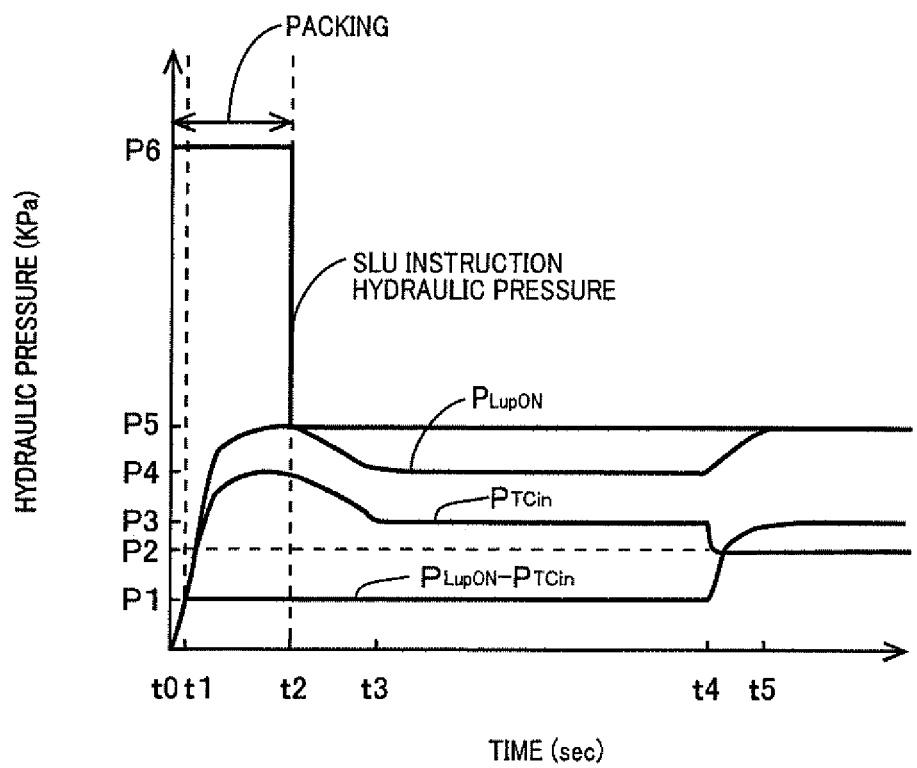
FIG. 5 is an example of a time chart during engaging of the lockup clutch for explaining a hydraulic pressure at the time of movement of a friction plate of the lockup clutch.

FIG. 5 is an example of a time chart schematically showing a behavior during engaging of the lockup clutch 32 and shows that the lockup engagement differential pressure Pc is affected by variation in the back pressure ($P_{TCin}$+$P_{TCout}$)/2 generated due to the movement of the lockup clutch 32 during engagement. In FIG. 5, for simplification, the torque-converter-in pressure $P_{TCin}$ is used as a representative of the back pressure, and the lockup engagement differential pressure Pc is shown as ($P_{LupON}$−$P_{TCin}$). At time t0, the engagement of the lockup clutch 32 is started, and an instruction pressure S1$u$ of the linear solenoid valve SLU is set to P6. This hydraulic pressure P6 corresponds to a fast fill, which temporarily increases the hydraulic pressure, performed for accelerating the engagement of the lockup clutch 32. At time t1, the difference pressure between the lockup-on pressure $P_{LupON}$ and the torque-converter-in pressure $P_{TCin}$, i.e., the lockup engagement differential pressure Pc, reaches P1, and the engagement of the lockup clutch 32 is started. At time t2, the instruction pressure S1$u$ of the linear solenoid valve SLU is reduced to P5, and the first fill (i.e., packing) is terminated. The torque-converter-in pressure $P_{TCin}$ is increased to P4. On the other hand, the lockup-on pressure $P_{LupON}$ is increased to P5 and the lockup engagement differential pressure Pc is maintained at P1. At time t3, the influence of the fast fill is almost not recognized, and the lockup-on pressure $P_{LupON}$, the torque-converter-in pressure $P_{TCin}$, and the lockup engagement differential pressure Pc nearly constant until t4 indicate P4, P3, and P1, respectively. At time t5 after the engagement of the lockup clutch 32 is completed at time t4, the lockup-on pressure $P_{LupON}$ indicates P5, which is the instruction pressure Slu of the solenoid valve SLU, while the torque-converter-in pressure $P_{TCin}$ and the lockup engagement differential pressure Pc indicate P2 and P3, respectively. As shown in FIG. 5, the engagement differential pressure Pc of the lockup clutch 32 is affected by a rise of the back pressure during the engagement of the lockup clutch 32 and becomes a predetermined hydraulic pressure after the engagement of the lockup clutch 32.

At the time of deceleration of the vehicle 10, if the slip control of controlling the slip of the lockup clutch 32, i.e., a deceleration flex control, and a fuel cut FC are performed, it is difficult to satisfy both fuel consumption and drivability at the same time unless the deceleration flex control and the fuel cut FC are coordinately performed at a predetermined timing. For example, in the case of only the fuel cut FC, when a torque capacity Tc of the lockup clutch 32, i.e., a torque transmitted by the lockup clutch 32, becomes insufficient due to the low lockup engagement differential pressure Pc, the engine rotation speed Ne immediately drops, immediately reaching a fuel cut lower limit rotation speed Nec or less, i.e., a resuming rotation speed of the engine 12. If the lockup clutch 32 is engaged at the resuming rotation speed of the engine 12, a shock occurs on the vehicle 10. Therefore, the deceleration flex control and the fuel cut FC of the engine 12 are coordinately performed. Conventionally, the fuel cut FC of the engine 12 after the deceleration flex control is not permitted until the engine torque Te becomes substantially zero and enters a stable state. Therefore, a time is required before performing the fuel cut FC of the engine 12 after the deceleration flex control, so that the fuel cut FC cannot easily be performed, or the engine 12 resumes in a short time from the fuel cut FC. In this example, when the engagement differential pressure Pc of the lockup clutch 32 reaches an unfailing slip pressure Pca, i.e., the slip pressure Pca at which the engine rotation speed Ne does not decrease due to a shortage of the torque capacity Tc of the lockup clutch 32, the fuel cut FC is permitted so as to perform the fuel cut FC at a proper timing (hereinafter, the engagement differential pressure Pc of the lockup clutch 32 not causing a decrease in the engine rotation speed Ne is also referred to as the unfailing slip pressure Pca). The slip pressure Pca not causing a decrease in the engine rotation speed Ne is affected by the engine torque Te at the start of, and during, the deceleration flex control. In the case of a hydraulic friction clutch that has the lockup-on pressure $P_{LupON}$ and the torque-converter-in pressure $P_{TCin}$ supplied to the control oil chamber 20$d$ and the front-side oil chamber 20$e$, respectively, and that is frictionally engaged when the differential pressure thereof, i.e., the lockup engagement differential pressure Pc, is controlled, the clutch is susceptible to the influence of variation of the back pressure and is significantly affected by the hydraulic oil temperature Toil. Additionally, the unfailing slip pressure Pca of the lockup clutch 32 varies due to the viscosity of the hydraulic oil and therefore varies depending on the hydraulic oil temperature Toil. From the above, the engine torque Te during deceleration running of the vehicle 10 due to accelerator-off and the hydraulic oil temperature Toil of the torque converter 20 are important for controlling the unfailing slip pressure Pca of the lockup clutch 32. Even in the case of a torque converter of a two-chamber type not shown in which the front-side oil chamber 20$e$ and the rear-side oil chamber 20$g$ of the torque converter 20 are not in the same chamber, i.e., the front-side oil chamber 20$e$ and the rear-side oil chamber 20$g$ are not always in communication with each other, the unfailing slip pressure Pca of the lockup clutch 32 is affected by the engine torque Te and the oil temperature Toil, and therefore, the same problem may occur as in the lockup clutch 32.

Returning to FIG. 1, the vehicle 10 is provided with the electronic control device 56 including a control device controlling portions related to running. The electronic control device 56 includes a so-called microcomputer including a CPU, a RAM, a ROM, and an I/O interface, for example, and the CPU executes signal processes in accordance with a program stored in advance in the ROM, while utilizing a temporary storage function of the RAM, to provide various controls of the vehicle 10.

The electronic control device 56 is supplied with various input signals detected by various sensors included in the vehicle 10. For example, the signals input to the electronic control device 56 are a signal indicative of a throttle valve opening degree θth (%) detected by a throttle valve opening degree sensor 70, a signal indicative of the vehicle speed V (km/h) detected by a vehicle speed sensor 72, a signal indicative of the oil temperature Toil (° C.) detected by an oil temperature sensor 74, a signal Acc (%) indicative of an operation amount of an accelerator pedal detected by an accelerator opening degree sensor 76, the engine rotation speed Ne (rpm) detected by an engine rotation speed sensor 77, and the turbine rotation speed Nt (rpm) detected by a turbine rotation speed sensor 78. The electronic control device 56 outputs a shift instruction pressure Sat for hydraulic control related to the shift of the automatic transmission 22, an instruction signal Se for an opening degree of a throttle valve not shown, an ignition timing of an ignition coil, a fuel injection amount, a valve timing, etc. related to the control of the engine torque Te (Nm) of the engine 12, the lockup instruction pressure (instruction pressure) Slu for the switching control of the operation state of the lockup clutch 32, etc. The lockup instruction pressure Slu is an instruction signal for driving the linear solenoid valve SLU regulating the lockup engagement pressure $P_{SLU}$ and is output to the linear solenoid valve SLU of the hydraulic control circuit 54.

The electronic control device 56 shown in FIG. 1 includes a slip control means 120 corresponding to a slip control portion of the present invention and a fuel cut control means 124 corresponding to a fuel cut control portion of the present invention, as a main portion of the control function thereof. The slip control means 120 is made up of a deceleration flex control start condition determining means 100, an engine torque calculating means 102, a slip pressure calculating means 104 corresponding to a slip pressure calculating portion of the present invention, a deceleration flex control means 106, and a slip pressure determining means 108. The fuel cut control means 124 is made up of an engine FC determining means 110 and an engine control means 112.

The deceleration flex control start condition determining means 100 determines whether a start condition of the deceleration flex control is satisfied, based on the fact that the signal Acc indicative of the operation amount of the accelerator pedal detected by the accelerator opening degree sensor 76 is made substantially zero, i.e., the accelerator pedal is turned off. By the deceleration flex control, i.e., allowing the first friction plate 38 and the second friction plate 44 constituting the lockup clutch 32 to slip at a predetermined target rotational speed difference at the time of the deceleration flex control, i.e., the accelerator-off, a shock at the time of engagement of the lockup clutch 32 can be reduced to achieve an improvement in drivability, and the engine rotation speed Ne during the deceleration running can be raised as much as possible to expand the region in which the fuel cut of the engine 12 (hereinafter, the fuel cut is also referred to as FC) is possible. The start condition of the deceleration flex control is judged from, for example, the facts that the engine rotation speed Ne is greater than the fuel cut rotation speed Nec, that the vehicle speed V is equal to or greater than a fuel cut cancelling vehicle speed Vc, that the hydraulic oil temperature Toil is greater than a predetermined oil temperature threshold value Ta, etc. In addition to the determination described above, the deceleration flex control start condition determining means 100 also judges whether the deceleration flex control starts as a transition from an acceleration flex control or starts as a transition from the released state of the lockup clutch 32.

When the deceleration flex control start condition determining means 100 judges that the deceleration flex control start condition is satisfied, the engine torque calculating means 102 calculates the engine torque Te from a preliminarily stored relationship between the engine rotation speed Ne and the engine torque Te during accelerator-off, and the slip pressure calculating means 104 calculates the unfailing slip pressure Pca of the lockup clutch 32 based on a preliminarily stored relationship, i.e., map, between the engine torque Te and the oil temperature Toil shown in FIG. 6, for example. The unfailing slip pressure Pca can also be obtained from a relational expression between the engine torque Te and the oil temperature Toil. For the map or relational expression described above, a different map or a different relational expression is used depending on whether the deceleration flex control starts as a transition from the acceleration flex control or starts as a transition from the released state of the lockup clutch 32. The slip pressure calculating means 104 selects the map or relational expression to be used based on an instruction from the deceleration flex control start condition determining means 100.

The deceleration flex control means 106 controls the slip pressure Pc toward the calculated unfailing slip pressure Pca. The slip pressure determining means 108 determines whether the slip pressure Pc is equal to or greater than the unfailing slip pressure Pca. When the slip pressure Pc is not equal to or greater than the unfailing slip pressure Pca, the calculation of the unfailing slip pressure Pca of the lockup clutch 32 and the control of the slip pressure Pc toward the newly calculated unfailing slip pressure Pca are repeated. When the slip pressure determining means 108 judges that the slip pressure Pc has reached the unfailing slip pressure Pca or higher, the slip pressure determining means 108 sets a fuel cut FC permission flag of the engine 12. Based on this flag, the engine FC determining means 110 determines whether the fuel cut FC of the engine 12 is possible, and the engine control means 112 performs the fuel cut FC of the engine 12 based on the determination result. For example, when the engine rotation speed Ne reaches the fuel cut rotation speed Nec or less, i.e., the resuming rotation speed of the engine 12, the fuel cut control means 124 terminates the fuel cut FC.

Figure 7:
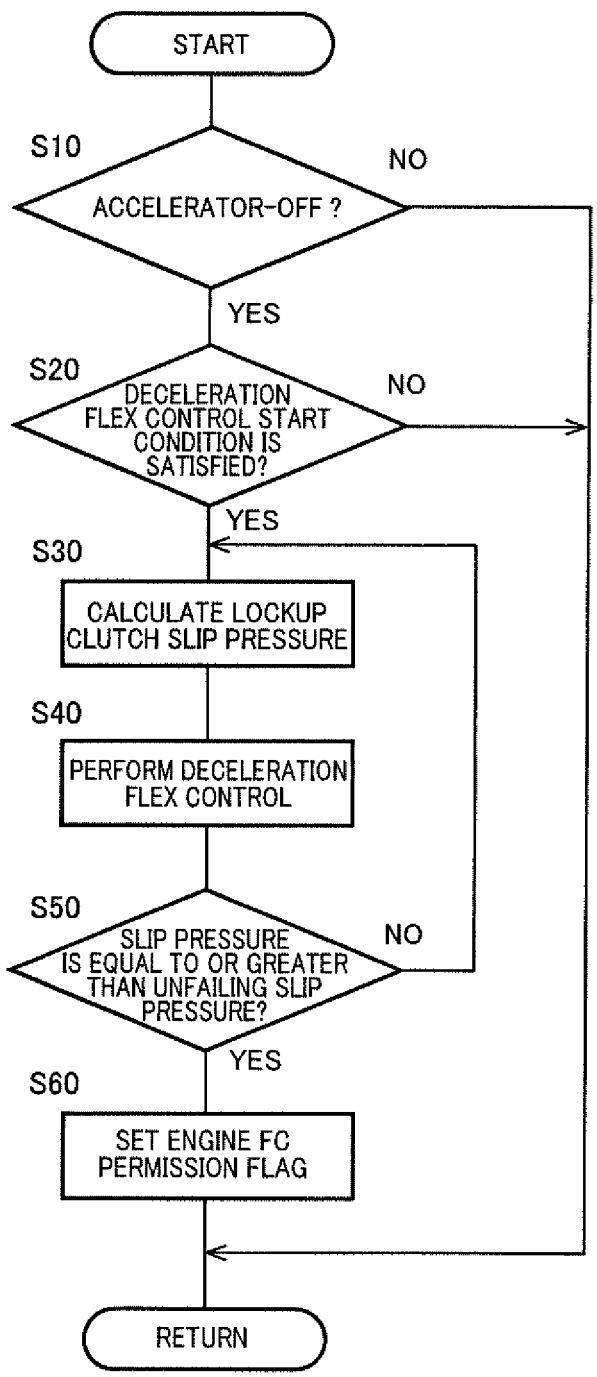
FIG. 7 is a flow chart for explaining a main portion of a control operation of an electronic control device of FIG. 1, i.e., a basic operation based on the slip pressure in an engagement control of the lockup clutch.

FIG. 7 is a flowchart for explaining the judgement of establishment of the deceleration flex control of the lockup clutch 32 and the setting of the unfailing slip pressure Pca of the lockup clutch 32 by the electronic control device 56. At step S10 (hereinafter, step will be omitted) corresponding to the function of the deceleration flex control start condition determining means 100, when it is judged that the accelerator is off, i.e., the signal Acc indicative of the operation amount of the accelerator pedal is substantially zero, it is determined at S20 corresponding to the function of the deceleration flex control start condition determining means 100 whether the deceleration flex control start condition is satisfied. If the determination of S20 is negative, the determination from S10 is repeated. If it is determined at S20 that the deceleration flex control start condition is satisfied, the slip pressure, i.e., the unfailing slip pressure Pca, of the lockup clutch 32 of the torque converter 20 is calculated based on the map of the engine torque Te and the oil temperature Toil of FIG. 6 at S30 corresponding to the functions of the engine torque calculating means 102 and the slip pressure calculating means 104.

At S40 corresponding to the deceleration flex control means 106, the control of the slip pressure Pc toward the calculated unfailing slip pressure Pca is provided. At S50 corresponding to the function of the slip pressure determining means 108, it is determined whether the slip pressure Pc is equal to or greater than the unfailing slip pressure Pca. If the determination of S50 is negative, the calculation of the unfailing slip pressure Pca of S30 is performed, and the slip pressure Pc is controlled based thereon at S40. If the determination of S50 is affirmative, i.e., when the slip pressure Pc becomes equal to or greater than the unfailing slip pressure Pca, the permission flag of the fuel cut FC of the engine 12 is set at S60 corresponding to the function of the slip pressure determining means 108. As a result, the fuel cut FC of the engine 12 becomes possible.

This example provides the electronic control device 56 of the vehicle 10 provided with the engine 12, the automatic transmission 22, the torque converter 20 disposed between the engine 12 and the automatic transmission 22, and the lockup clutch 32 directly coupling the pump impeller 20p that is the input member to the turbine impeller 20t that is the output member of the torque converter 20; the electronic control device 56 of the vehicle 10 has the slip control means 120 controlling the slip of the lockup clutch 32 at the time of the deceleration running and the fuel cut control means 124 performing the fuel cut FC of the engine 12 at the time of the deceleration running and terminating the fuel cut FC when the engine rotation speed Ne is reduced to the predetermined rotation speed Nec or less during the fuel cut; the electronic control device 56 comprises the slip pressure calculating means 104 calculating the slip pressure Pc of the lockup clutch 32 at which the engine rotation speed Ne does not decrease during the slip control of the lockup clutch 32 by the slip control means 120 at the time of the deceleration running, based on the output torque Te of the engine 12 and the oil temperature Toil; the fuel cut control means 124 is permitted to perform the fuel cut FC of the engine 12, based on the fact that the slip pressure Pc of the lockup clutch 32 controlled by the slip control means 120 has reached the slip pressure Pca at which the rotation speed Ne of the engine 12 does not decrease due to a shortage of the torque capacity of the lockup clutch 32 even when the fuel cut is performed; and therefore, the slip control of the lockup clutch 32 at the time of the deceleration running and the fuel cut control of the engine 12 during running of the vehicle 10 can easily coordinately be provided, so that both the improvement in drivability and the improvement in fuel consumption can be achieved at the same time.

Another example of the present invention will be described. In the following description, the portions common to the example described above are denoted by the same reference numerals and will not be described.

Example 2

Figure 8:
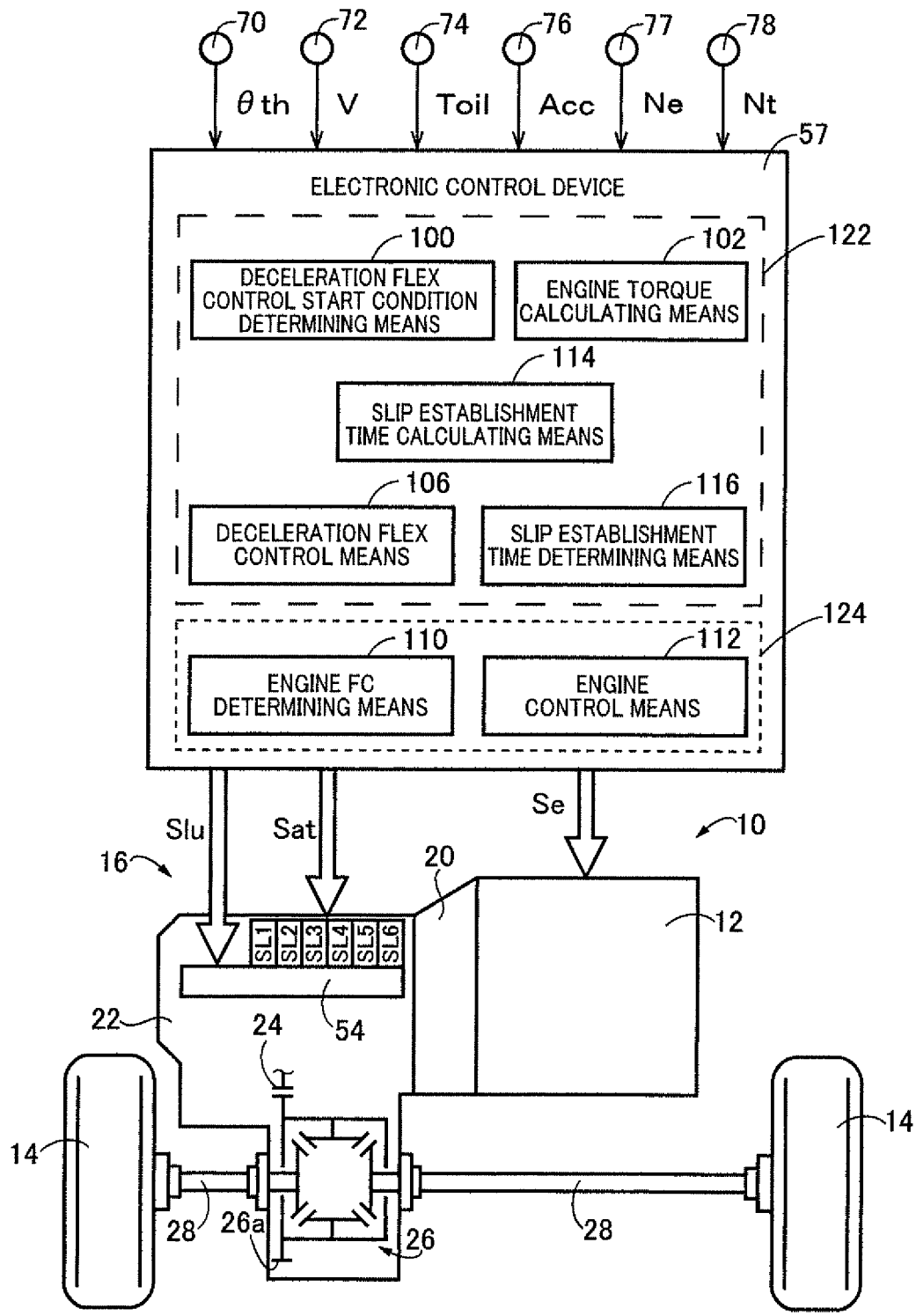
FIG. 8 is a diagram for explaining a schematic configuration of a vehicle to which the present invention is applied and is a diagram for explaining a main portion of a control system for various controls in the vehicle.

An electronic control device (corresponding to the control device of the present invention) 57 shown in FIG. 8 includes a slip control means 122 corresponding to a slip control portion of the present invention and a fuel cut control means 124 corresponding to a fuel cut control portion of the present invention, as a main portion of the control function thereof. The slip control means 122 is made up of the deceleration flex control start condition determining means 100, the engine torque calculating means 102, a slip establishment time calculating means 114 corresponding to a slip establishment time calculating portion of the present invention, the deceleration flex control means 106, and a slip establishment time determining means 116. The fuel cut control means 124 includes the engine FC determining means 110 and the engine control means 112. In the first example, the slip pressure calculating means 104 calculates the unfailing slip pressure Pca, and the slip pressure determining means 108 determines whether the slip pressure Pc is equal to or greater than the unfailing slip pressure Pca. In this example, the slip establishment time calculating means 114 calculates a time tca until the slip pressure Pc reaches the unfailing slip pressure Pca, and the slip establishment time determining means 116 determines whether a slip time tc having elapsed after the start of the slip control is equal to or greater than the time tca until the slip pressure Pc reaches the unfailing slip pressure Pca, thereby determining whether the fuel cut FC of the engine 12 is possible. Only this portion is different from the first example.

When the deceleration flex control start condition determining means 100 judges that the deceleration flex control start condition is satisfied, the engine torque calculating means 102 calculates the engine torque Te from the preliminarily stored relationship between the engine rotation speed Ne and the engine torque Te during accelerator-off, and the slip establishment time calculating means 114 calculates the slip establishment time tca until the slip pressure Pc reaches the unfailing slip pressure Pca based on a preliminarily stored relationship, i.e., map, between the engine torque Te and the oil temperature Toil shown in FIG. 9, for example. A different map is used depending on whether the deceleration flex control starts as a transition from the acceleration flex control or starts as a transition from the released state of the lockup clutch 32. The slip establishment time calculating means 114 selects any map based on an instruction from the deceleration flex control start condition determining means 100.

The deceleration flex control means 106 controls the slip pressure Pc toward the unfailing slip pressure Pca. The slip establishment time determining means 116 determines whether the time tc is equal to or greater than the slip establishment time tca until the slip pressure Pc reaches the unfailing slip pressure Pca. If it is determined that the elapsed time tc from the start of the slip control is not equal to or greater than the slip establishment time tca until the unfailing slip pressure, the calculation of the slip establishment time tca until the slip pressure Pc reaches the unfailing slip pressure Pca and the control toward the unfailing slip pressure Pca are repeated. If the slip establishment time determining means 116 judges that the time tc is equal to or greater than the slip establishment time tca until the unfailing slip pressure, the slip establishment time determining means 116 sets the fuel cut FC permission flag of the engine 12. Based on this flag, the engine FC determining means 110 determines whether the fuel cut FC of the engine 12 is possible, and the engine control means 112 performs the fuel cut FC of the engine 12 based on the determination.

Figure 10:
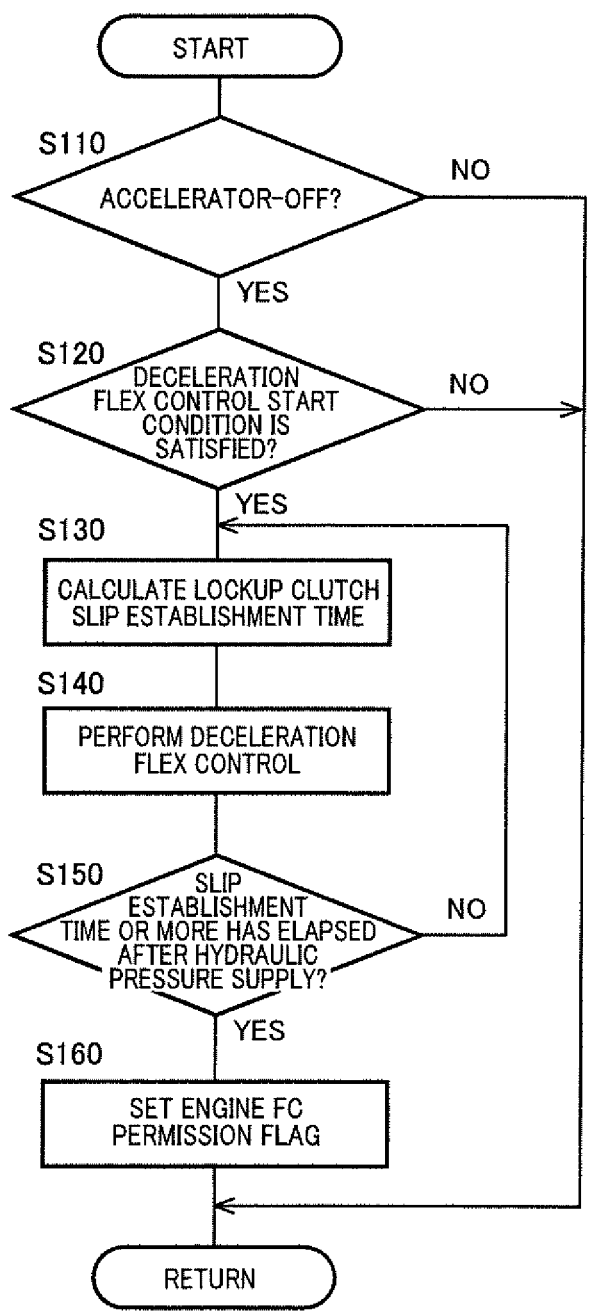
FIG. 10 is a flow chart for explaining a main portion of a control operation of an electronic control device of FIG. 8, i.e., a basic operation based on the slip establishment time of the engagement control of the lockup clutch.

FIG. 10 is a flowchart for explaining the judgement of the establishment of the deceleration flex control of the lockup clutch 32 and the setting of the slip establishment time tca until the unfailing slip pressure of the lockup clutch 32 by the electronic control device 57. At step S110 corresponding to the function of the deceleration flex control start condition determining means 100, when it is judged that the accelerator is off, i.e., the signal Acc indicative of the operation amount of the accelerator pedal is substantially zero, it is determined at S120 corresponding to the function of the deceleration flex control start condition determining means 100 whether the deceleration flex control start condition is satisfied. If the determination of S120 is negative, the determination from S110 is repeated. If it is determined at S120 that the deceleration flex control start condition is satisfied, a calculation is performed to obtain the time until the slip pressure Pc of the lockup clutch 32 of the torque converter 20 reaches the slip pressure Pca at which the engine rotation speed Ne does not decrease, i.e., the slip establishment time tca until the unfailing slip pressure Pca, based on the map of the torque Te of the engine 12 and the oil temperature Toil of FIG. 9, at S130 corresponding to the functions of the engine torque calculating means 102 and the slip establishment time calculating means 114.

At S140 corresponding to the deceleration flex control means 106, the control of the slip pressure Pc toward the calculated unfailing slip pressure Pca is provided. At S150 corresponding to the function of the slip establishment time determining means 116, it is determined whether the elapsed time from the start of the slip control is equal to or greater than the slip establishment time tca until the unfailing slip pressure. If the determination of S150 is negative, the calculation of the slip establishment time tca until the unfailing slip pressure Pca of S130 is performed, and the slip pressure Pc is controlled at S140. If the determination of S150 is affirmative, i.e., when the time is equal to or greater than the slip establishment time tca until the slip pressure Pc reaches the unfailing slip pressure Pca, the permission flag of the fuel cut FC of the engine 12 is set at S160 corresponding to the function of the slip establishment time determining means 116. As a result, the fuel cut FC of the engine 12 becomes possible.

As described above, the electronic control device 57 of this example further comprises the slip establishment time calculating means 114 calculating the slip establishment time tca from the start of the slip control of the lockup clutch 32 until the unfailing slip pressure Pca at which the lockup clutch 32 does not fail due to a shortage of the torque capacity Tc of the lockup clutch 32 even when the fuel cut FC is performed and, if the elapsed time tc from the start of the slip control of the lockup clutch 32 is equal to or greater than the slip establishment time tca, the fuel cut of the engine 12 is made possible, and therefore, the slip control of the lockup clutch 32 at the time of the deceleration running and the fuel cut control of the engine 12 during running of the vehicle 10 can more easily coordinately be provided, so that both the improvement in drivability and the improvement in fuel consumption can be achieved at the same time.

Although the examples of the present invention have been described in detail with reference to the drawings, the present invention is also applicable to other forms.

Although the torque converter 20 and the step-variable automatic transmission 22 are used in the examples, the present invention is not particularly limited to a step-variable automatic transmission and may be configured to include a continuously variable transmission such as a belt type continuously variable transmission having a transmission belt wound around a pair of variable pulleys and the torque converter 20.

In the automatic transmission 22 of the examples, the eight-speed gear positions are used; however, the transmission is not particularly limited to eight speeds and may have, for example, a smaller number of gear positions or a larger number of gear positions, for example, ten-speed gear positions, or may be a continuously variable transmission.

In the first example, the permission of the fuel cut FC of the engine 12 is determined based on the fact that the slip pressure Pc of the lockup clutch 32 has reached the unfailing slip pressure Pca of the lockup clutch 32. In the second example, the slip establishment time calculating means 114 is further included that calculates the slip establishment time tca from the start of the slip control of the lockup clutch 32 until the unfailing slip pressure Pca of the lockup clutch 32, and the permission of the fuel cut FC of the engine 12 is determined based on the fact that the elapsed time tc from the start of the slip control of the lockup clutch 32 has reached the slip establishment time tca. The two determinations, i.e., the determination based on reaching the slip pressure Pca in the first example and the determination based on the slip establishment time tca until reaching the unfailing slip pressure in the second example, may both performed and, if the fuel cut FC is permitted according to one of the two determinations, for example, it may be determined that the fuel cut FC is permitted, or if the fuel cut FC is permitted according to both of the determinations it may be determined that the fuel cut FC is permitted.

The above description is merely an embodiment and the present invention can be implemented in variously modified and improved forms based on the knowledge of those skilled in the art.

NOMENCLATURE OF ELEMENTS

10: Vehicle
12: Engine
20: Torque converter
20p: Pump impeller (Input member)
20t: Turbine impeller (Output member)
22: Automatic transmission
32: Lockup clutch
56; 57: Electronic control device (Control device)
104: Slip pressure calculating means
114: Slip establishment time calculating means
120; 122: Slip control means
124: Fuel cut control means
Tc: Torque capacity
Te: Engine torque (Output torque of the engine)
Toil: Hydraulic oil temperature (Oil temperature)
tc: Slip time (Elapsed time from a start of a slip control)
tca: Slip establishment time
Pc: Slip pressure
Pca: Slip pressure of the lockup clutch at which the rotation speed of the engine does not decrease
Ne: Engine rotation speed
Nec: Predetermined rotation speed

What is claimed is:

1. A control device of a vehicle provided with an engine, an automatic transmission and a torque converter disposed between the engine and the automatic transmission, and the torque converter including a lockup clutch directly coupling an input member to an output member of the torque converter, the control device of the vehicle comprising:
a slip control portion configured to control a slip of the lockup clutch at a time of deceleration running; and
a fuel cut control portion configured to perform a fuel cut of the engine at the time of deceleration running and to terminate the fuel cut when an engine rotation speed is reduced to a predetermined rotation speed or less but greater than zero during the fuel cut,
the fuel cut control portion being permitted to perform the fuel cut of the engine, based on a slip pressure of the lockup clutch controlled by the slip control portion having reached a slip pressure value at which the rotation speed of the engine does not decrease from a value greater than zero due to a shortage of torque capacity of the lockup clutch even when the fuel cut is performed.

2. The control device of a vehicle according to claim 1, comprising
a slip pressure calculating portion configured to calculate a slip pressure of the lockup clutch at which the rotation speed of the engine does not decrease based on an output torque of the engine and an oil temperature during the slip control of the lockup clutch by the slip control portion at the time of deceleration running, wherein
the fuel cut control portion is permitted to perform the fuel cut of the engine if the slip pressure of the lockup clutch is equal to or greater than the slip pressure value of the lockup clutch at which the rotation speed of the engine does not decrease due to a shortage of torque capacity of the lockup clutch even when the fuel cut is performed.

3. The control device of a vehicle according to claim 1, comprising
a slip establishment time calculating portion configured to calculate a slip establishment time from a start of the slip control of the lockup clutch until reaching the slip pressure value of the lockup clutch at which the rotation speed of the engine does not decrease due to a shortage of torque capacity of the lockup clutch even when the fuel cut is performed, based on an output torque of the engine and an oil temperature, wherein the fuel cut control portion is permitted to perform the fuel cut of the engine when an elapsed time from the start of the slip control of the lockup clutch is equal to or greater than the slip establishment time.

4. The control device of a vehicle according to claim 2, comprising a slip establishment time calculating portion configured to calculate a slip establishment time from a start of the slip control of the lockup clutch until reaching the slip pressure value of the lockup clutch at which the rotation speed of the engine does not decrease due to a shortage of torque capacity of the lockup clutch even when the fuel cut is performed, based on the output torque of the engine and the oil temperature, wherein the fuel cut control portion is permitted to perform the fuel cut of the engine when an elapsed time from the start of the slip control of the lockup clutch is equal to or greater than the slip establishment time.

* * * * *